United States Patent [19]
Arold et al.

[11] Patent Number: 5,095,948
[45] Date of Patent: Mar. 17, 1992

[54] SIMULTANEOUS ADJUSTMENT DEVICE FOR AT LEAST TWO PIVOTED ELEMENTS

[75] Inventors: Klaus Arold; Otto Player, both of Sindelfingen, Fed. Rep. of Germany

[73] Assignee: Mercedes-Benz AG, Fed. Rep. of Germany

[21] Appl. No.: 603,319

[22] Filed: Oct. 25, 1990

[30] Foreign Application Priority Data

Nov. 4, 1989 [DE] Fed. Rep. of Germany ....... 3936776

[51] Int. Cl.$^5$ .................. F16K 31/524; F16K 31/528
[52] U.S. Cl. .................................. 137/636.1; 74/567; 74/569; 454/160; 454/334; 137/656.4; 25/229; 25/252
[58] Field of Search ............ 98/2, 2.08; 74/567, 74/569; 137/636, 636.1, 636.2, 636.4; 251/229, 252

[56] References Cited

U.S. PATENT DOCUMENTS

| | | | |
|---|---|---|---|
| 1,203,321 | 10/1916 | Fosdick | 137/636.1 |
| 1,937,152 | 11/1933 | Junk | 74/569 |
| 2,634,670 | 4/1953 | Simons | 98/2.06 |
| 4,006,673 | 2/1977 | Meyer et al. | 98/2 |
| 4,092,907 | 6/1978 | Meyer et al. | 98/2 |
| 4,223,754 | 9/1980 | Mizuno et al. | 98/2.08 |

FOREIGN PATENT DOCUMENTS

| | | | |
|---|---|---|---|
| 0337382 | 4/1989 | European Pat. Off. | |
| 1562630 | 3/1980 | Fed. Rep. of Germany | |
| 0149397 | 7/1985 | Fed. Rep. of Germany | |
| 8906054 | 5/1990 | Fed. Rep. of Germany | |
| 2432380 | 2/1980 | France | |
| 2459511 | 2/1981 | France | 98/2 |
| 0110318 | 6/1983 | Japan | 98/2 |

Primary Examiner—George L. Walton
Attorney, Agent, or Firm—Evenson, Wands, Edwards, Lenahan & McKeown

[57] ABSTRACT

A device for simultaneously adjusting at least two pivoted elements, in particular valves used for air distribution in a vehicle heating or air-conditioning system, has an operating unit with a control disc which is connected to a rotary knob and a control groove which is closed upon itself and into which at least two levers engage which are pivotably accommodated by the operating unit and whose pivoting movements are transmitted to the pivoted elements. Simple tolerance compensation and installation without subsequent setting work is possible when each lever has a separate pivot bearing. The pivoting movements, occurring when the control groove is followed, of the bearing pin of each lever, with a universal-joint arrangement in between which leads away essentially in the axial direction of the bearing pins and permits length compensation, are transmitted from the operating unit to pivoted levers mounted on the heating box side.

7 Claims, 1 Drawing Sheet

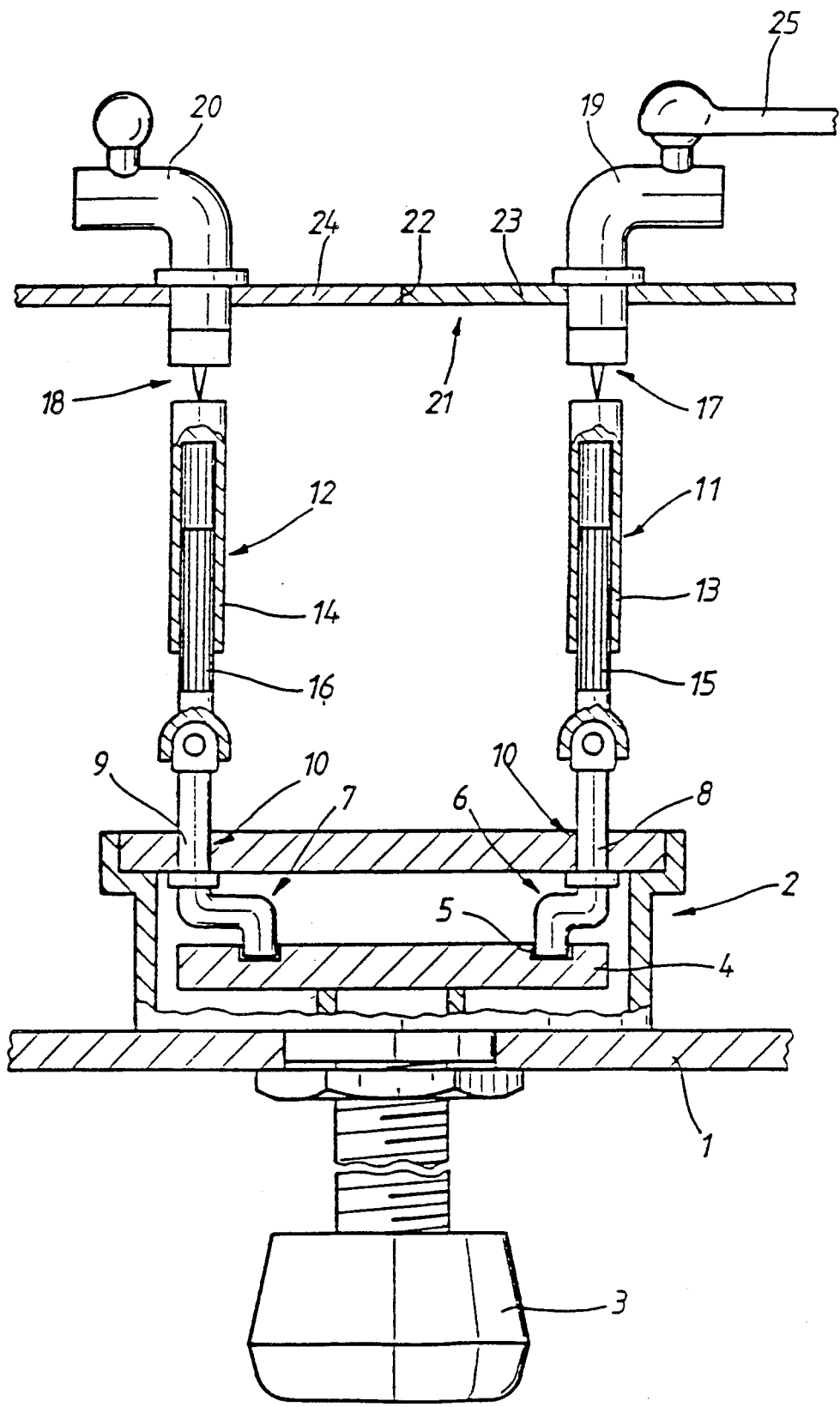

ated in detail, it is to be clearly understood that the same is by way of illustration and example, and is not to be taken by way of limitation. The spirit and scope of the present invention are to be limited only by the terms of the appended claims.

SIMULTANEOUS ADJUSTMENT DEVICE FOR AT LEAST TWO PIVOTED ELEMENTS

BACKGROUND AND SUMMARY OF THE INVENTION

The present invention relates to a device for a simultaneously adjusting at least two pivoted elements such as valves used for air distribution in a heating and/or air-conditioning system. An operating unit has a control disc which is connected to a rotary knob and has a closed-loop control groove (i.e. the groove is closed upon itself). At least two levers engage in the groove and are pivotably accommodated by the operating unit. The movements of the levers imposed by the curved shape of the control groove during rotation of the control disc are transmitted to the pivoted elements.

European Patent Specification 0,149,397 discloses a regulating device of this general type. Both levers have a common bearing point, and the adjusting movements are taken as lifting movements on the lever arm side and transmitted by a linkage or a cable. The adjusting movements are thus taken in the operating unit and in the pivoting plane of the levers so that, for space reasons, difficulties can occur when establishing the transmission path. Furthermore, assembly is complicated and also time-consuming, since extensive adjusting measures are necessary.

An object of the present invention is to provide a regulating device which has a simple-to-control, short transmission paths and automatic tolerance compensation which takes place in the course of producing the motion-transmission path. Another object of the present invention is ease of assembly through the use of previously adjusted assemblies so that setting work can be dispensed with in the course of assembly.

The foregoing objects have been achieved in a device for simultaneously adjusting at least two pivoted elements in accordance with the present invention by providing each lever with a separate pivot bearing, and the pivoting movements of the bearing pin of each lever, occurring when the control groove are transmitted from an operating panel to pivoted levers mounted on a box of a heating and/or air conditioning system.

The length tolerances appearing in the transmission path between the operating unit and the heating box can easily be compensated when the universal-joint arrangement has a sliding sleeve and a sliding shaft guided in a longitudinally displaceable manner in this sliding sleeve in such a way as to be rotationally fixed. The sliding sleeve, in a certain allocation or relationship to the rotary position of the sliding shaft, is coupled to the sliding shaft only when the operating unit is attached.

The adjustment on the heating box side made before installation in the motor vehicle is retained when the sliding sleeves are fixed in their assembly position by a locking which is removable when the connection between sliding sleeve and sliding shaft is being made.

The pre-adjustment is facilitated when the heating box consists of a top part and a bottom part, and the parting line runs in such a way that the pivoted lever transmitting control movements for defrosting nozzles is allocated to the top part and the pivoted lever activating the foot-space nozzles is allocated to the bottom part.

BRIEF DESCRIPTION OF THE DRAWING

These and other objects, features and advantages of the present invention will become more apparent from the following detailed description of a presently preferred embodiment when taken in conjunction with the accompanying sole drawing FIGURE which is partially cross sectioned side view of the simultaneous adjustment device in accordance with the present invention.

DETAILED DESCRIPTION OF THE DRAWING

An operating panel or face 1, for example, a center control panel in a passenger car (not shown in further detail), accommodates an operating unit 2 whose rotary knob 3 is connected to a control disc 4. A closed-loop control groove 5 is recessed in the control disc 4, and two levers 6, 7 engage in the control groove 5 with bearing pins 8, 9, mounted in a fixed position so as to form pivot bearings 10.

Universal-joint arrangements 11, 12 axially adjoin pins 8, 9 and, apart from an angular offset, are also able to compensate length tolerances by the use of sliding sleeves 13, 14 and sliding shafts 15, 16 respectively guided therein in such a way as to be longitudinally displaceable and rotatably fixed. Pivoted levers 19, 20 have film-joint arrangements 17, 18 therebetween arranged cross-wise and intended for angular offset compensation. The levers 19, 20 adjoin respective sliding sleeves 13, 14 and are mounted in the housing wall of a heating box 21 of a heating or air-conditioning system.

The heating box 21 has a parting line 22 which runs in such a way that the pivoted lever 19 is allocated to a top part 23 and the pivoted lever 20 is allocated to bottom part 24. A linkage 25 leads away from each pivoted lever 19, 20 (only the linkage 25 at the pivoted lever 19 is shown in the figure) and is connected in a manner (also not shown) to at least one conventional valve (not shown) which represents a pivoted element and which is used for the air distribution. In this arrangement, the valves producing a defrosting effect are activated via the pivoted lever 19, while the valves undertaking the air distribution to the foot space are controlled via the pivoted lever 20.

The position of the parting line 22 makes it possible first to adjust all valves independently of one another, e.g. in the defrosting position, section to join together the top part 23 and the bottom part 24, and third then to lock the sliding sleeves 13 and 14 for maintaining the adjusted position, which can easily be achieved by a locking wire connecting both sliding sleeves 13 and 14 to one another. For further assembly, the control knob 3 is moved into the defrosting position and the sliding shaft 15, 16 is inserted into the respectively allocated sliding sleeve 13, 14 in such a way as to be rotationally fixed. After the lock temporarily securing both sliding sleeves 13 and 14 relative to one another is removed, the device is in the operative state without additional adjusting measures.

Although the invention has been described and illustrated in detail, it is to be clearly understood that the same is by way of illustration and example, and is not to be taken by way of limitation. The spirit and scope of the present invention are to be limited only by the terms of the appended claims.

We claim:
1. A device for simultaneously adjusting a plurality of pivoted valve elements operatively arranged on a vehi- cle heating/air-conditioning system heating box for air distribution in the vehicle heating/air-conditioning system, comprising an operating unit operatively mounted in an operating face of a vehicle panel and provided with a control disk, a rotary knob accessible to an operator at the operating face and operatively connected with the control disk, the control disk having a closed curved groove, a plurality of first levers arranged in the operating unit and configured to engage in the control groove such that movement of the control disk is caused by rotation of the rotary knob, bearing sections connected with the levers and rotatably mounted in the operating unit, a plurality of second levers associated with the pivoted valve elements, and a universal joint arrangement operatively arranged between the second levers and the bearing sections to form a transmission path such that rotation of the control disk causes pivoting movements of the valve elements, wherein the universal joint arrangement is axially disposed between the bearing sections and the second levers and comprises a sliding sleeve and a sliding shaft longitudinally displaceably guided but rotationally fixed in the sliding sleeve to permit a length compensation in the axial direction between the bearing sections and second levers to compensate for length tolerances in the transmission path between the operating unit and the heating/air conditioning system heating box.

2. The device according to claim 1, wherein each sliding sleeve, in a certain relationship to the rotary position of the sliding shaft, is coupled to the sliding shaft when the operating unit is attached.

3. The device according to claim 2, wherein the sliding sleeves are fixed in their assembled position by a lock which is removable at the time the connection between the sliding sleeves and the sliding shaft is being made.

4. The device according to claim 1, wherein the heating box consists of a top part and a bottom part, and a parting line between the top part and the bottom part runs in such a way that one of the pivoted levers transmits control movements for defrosting nozzles and is allocated to the top part, and the other pivoted lever activates foot-space nozzles and is allocated to the bottom part.

5. The device according to claim 4, wherein each sliding sleeve, in a certain relationship to the rotary position of the sliding shaft, is coupled to the sliding shaft when the operating unit is attached.

6. The device according to claim 4, wherein the sliding sleeves are fixed in their assembled position by a lock which is removable at the time the connection between the sliding sleeves and the sliding shaft is being made.

7. The device according to claim 6, wherein each sliding sleeve, in a certain relationship to the rotary position of the sliding shaft, is coupled to the sliding shaft when the operating unit is attached.

* * * * *